United States Patent
Goetz (10) Patent No.: US 11,140,984 B2
(45) Date of Patent: Oct. 12, 2021

(54) FURNITURE DAMPER

(71) Applicant: Julius Blum GmbH, Hoechst (AT)

(72) Inventor: Christof Goetz, Lustenau (AT)

(73) Assignee: JULIUS BLUM GMBH, Hoechst (AT)

( * ) Notice: Subject to any disclaimer, the term of this patent is extended or adjusted under 35 U.S.C. 154(b) by 0 days.

(21) Appl. No.: 16/731,301

(22) Filed: Dec. 31, 2019

(65) Prior Publication Data
US 2020/0128960 A1 Apr. 30, 2020

Related U.S. Application Data (63) Continuation of application No. PCT/AT2018/060127, filed on Jun. 22, 2018.

(30) Foreign Application Priority Data

Jul. 13, 2017 (AT) .............................. A 50585/2017

(51) Int. Cl.
*A47B 88/477* (2017.01)
*E05F 5/00* (2017.01)
*E05F 5/10* (2006.01)

(52) U.S. Cl.
CPC ............ *A47B 88/477* (2017.01); *E05F 5/003* (2013.01); *E05F 5/10* (2013.01); *E05Y 2900/20* (2013.01)

(58) Field of Classification Search
CPC ............... A47B 88/473; A47B 88/477; A47B 2210/0094; F16F 9/34; F16F 9/3405; E05F 5/003; E05F 5/10; E05Y 2900/20
See application file for complete search history.

(56) References Cited

U.S. PATENT DOCUMENTS 2,941,629 A * 6/1960 Rohacs .................. F16K 15/00
188/320
5,450,933 A 9/1995 Schüttler
(Continued)

FOREIGN PATENT DOCUMENTS

AT 12 633 9/2012
CN 203334865 12/2013
(Continued)

OTHER PUBLICATIONS

Search Report dated Apr. 17, 2020 in corresponding Taiwanese Patent Application No. 107123697.
(Continued)

*Primary Examiner* — Matthew W Ing
(74) *Attorney, Agent, or Firm* — Wenderoth, Lind & Ponack, L.L.P.

(57) ABSTRACT

A furniture fitting includes a housing, a fluid chamber arranged in the housing, a damping fluid in the fluid chamber, a piston having an overload opening and displaceably arranged in the fluid chamber for performing a damping hub, and an overload safety device in the piston and having a closure element pressurized by a force storage member. The closure element blocks the overload opening of the piston below a predetermined threshold value of a pressure application to the piston, and unblocks the overload opening of the piston against a force of the force storage member above the predetermined threshold value. Due to the unblocking of the overload opening, a fluid-conductive connection between a high pressure side and a low-pressure side of the fluid chamber is unblocked. The closure element includes a throttle opening for passage of the damping fluid from the high-pressure side to the low-pressure side.

19 Claims, 6 Drawing Sheets

(56) References Cited

U.S. PATENT DOCUMENTS

| | | | |
|---|---|---|---|
| 5,620,066 | A | 4/1997 | Schüttler |
| 2004/0021406 | A1* | 2/2004 | Salice ................ A47B 88/467 312/334.14 |
| 2007/0046159 | A1* | 3/2007 | Hoffman ............. A47B 88/467 312/333 |
| 2017/0211653 | A1* | 7/2017 | Zuo ........................ F16F 9/446 |
| 2018/0231092 | A1 | 8/2018 | Pecar et al. |

FOREIGN PATENT DOCUMENTS

| | | |
|---|---|---|
| CN | 206320220 | 7/2017 |
| DE | 1 037 209 | 8/1958 |
| DE | 201 07 426 | 10/2001 |
| DE | 20 2008 002 407 | 7/2008 |
| FR | 2 594 473 | 8/1987 |
| JP | 48-38428 | 5/1973 |
| JP | 56-32137 | 3/1981 |
| JP | 6-323356 | 11/1994 |
| JP | 2005-230468 | 9/2005 |
| TW | 200745459 | 12/2007 |
| WO | 03/081077 | 10/2003 |
| WO | 2006/029421 | 3/2006 |
| WO | 2017/029102 | 2/2017 |

OTHER PUBLICATIONS

International Search Report dated Sep. 27, 2018 in International (PCT) Application No. PCT/AT2018/060127.

Search Report dated Jan. 13, 2021 in Chinese Patent Application No. 201880046110.8.

\* cited by examiner

FURNITURE DAMPER

BACKGROUND OF THE INVENTION

The present invention relates to a furniture fitting having at least one furniture damper for dampening a movement of a movably supported furniture part, the furniture damper including a housing, at least one fluid chamber arranged in the housing, the fluid chamber having a high-pressure side and a low-pressure side, a damping fluid arranged in the fluid chamber, and at least one piston having at least one overload opening. The piston is displaceably arranged in the fluid chamber for performing a damping hub, and the high-pressure side and the low-pressure side of the fluid chamber are separated from one another by the piston. An overload safety device is arranged in the piston, and the overload safety device has a closure element pressurized by a force storage member. The closure element blocks the at least one overload opening of the piston below a predetermined threshold value of a pressure application to the piston, and unblocks the at least one overload opening of the piston against a force of the force storage member above the predetermined threshold value of a pressure application to the piston. Due to the unblocking of the overload opening, a fluid-conductive connection between the high pressure side and the low-pressure side of the fluid chamber is unblocked.

JP S4838428 U (May 12, 1973) discloses a non-generic prior art in the form of a shock absorber for vehicles, and the shock absorber includes an overload safety device having a valve body pressurized by a spring. The valve body is provided with a passage opening, so that the damping fluid can stream from the high-pressure side to the low-pressure side.

WO 2017/029102 A1 and JP S5632137U (Mar. 28, 1981) disclose damping devices having a stabilizing element arranged on the piston rod, and the stabilizing element prevents a lateral bulging of the piston rod.

General furniture dampers for dampening movably supported furniture parts are disclosed in WO 03/081077 A1, WO 2006/029421 A1, DE 201 07 426 U1, AT 12 633 U1 and in DE 20 2008 002 407 U1.

Furniture fittings having a furniture damper are used, for example, for dampening a closing movement of movable furniture parts (drawers, doors or flaps), or of movably-supported components of furniture fitting portions, so that a noisy slamming and damages of the furniture parts can be prevented. The damping action of the furniture dampers is generated by a flow resistance of a damping fluid arranged in a housing. Upon a pressure application, the piston is displaced within the fluid chamber, and the damping fluid streams from the high-pressure side to the low-pressure side through piston openings and/or through a gap formed between the piston and an inner wall of the fluid chamber. If the pressure application to the piston results too high, for example in the case of misuse, a so-called damper bouncing may occur. In such an overload case, the damping fluid can no longer stream in a sufficient manner through the piston or past the piston. In that case, the increased pressure can no longer be dissipated by the damper, so that the piston and the piston rod fixed thereto abruptly stops or bounces back.

Overload safety devices for furniture dampers are widely known, for example from AT 12 633 U1 to the present applicant. These overload safety devices usually include a ball pressurized by a spring. The ball, during normal use (i.e. below a predetermined pressure application to the piston), blocks an overload opening of the piston. In an overload case (i.e. above the predetermined pressure application to the piston), the ball unblocks the overload opening of the piston against a force of the force storage member, whereby a fluid-conductive connection between the high-pressure side and the low-pressure side is unblocked. Due to the unblocking the fluid-conductive connection, an increased amount of damping fluid can be transferred from the high-pressure side to the low-pressure side, so that the pressure within the furniture damper can be rapidly dissipated and a burst of the housing of the furniture damper can be prevented.

By the arrangement of flow channels on an inner wall of the cylinder, a path-dependent control of the damping power can be established. The flow channels can thereby be configured such that the operative flow cross-section can be reduced along the damping hub (DE 20 2008 002 407 U1, see FIG. 7). In this way, the flow resistance of the damping fluid and the damping power are the greater the more the piston is pushed into the cylinder. A drawback is the fact that the production of such flow channels is relatively elaborate and that the installation space of the furniture damper is correspondingly enlarged.

SUMMARY OF THE INVENTION

It is an object of the present invention to propose a furniture fitting of the type mentioned in the introductory part, thereby avoiding the drawbacks as discussed above. Besides a compact construction, a load-proof operation of the furniture damper is also achieved.

According to the invention, the closure element includes at least one throttle opening for the passage of the damping fluid from the high-pressure side to the low-pressure side at least when performing the damping hub.

In other words, the closure element for blocking the overload opening arranged in the piston includes at least one throttle opening through which the damping fluid, also when performing a damping hub during normal operation (i.e. below a predetermined threshold value of a pressure applied to the piston), can stream. Due to the arrangement of such a throttle opening, at least an amount of the braking force can be generated, without that there is the compelling necessity that additional flow channels need to be arranged on the piston and/or on the inner wall of the fluid chamber. Of course, these streaming channels can also be provided in addition to the throttle opening of the closure element.

According to an embodiment, the throttle opening can be in an open condition in each operating position of the furniture damper. In this way, the damping fluid can stream through the throttle opening of the closure element when performing the damping hub as well as when performing the return hub. The damping fluid can be configured so as to be gaseous or hydraulic.

According to an embodiment, the closure element has a cylindrical and/or a conical shell surface. The damping fluid, above the predetermined threshold value of pressure applied to the piston, can be passed along the cylindrical and/or conical shell surface downstream of the overload opening through the fluid-conductive connection along the cylindrical and/or conical shell surface in an axial direction, or can be deflected away from the cylindrical and/or conical shell surface of the closure element in a radial direction.

Due to the cylindrical and/or conical shell surface of the closure element, the damping fluid, in an overload case, is deflected such that a stagnation pressure, in a region behind (i.e. downstream) the closure element, can be prevented or can be at least reduced such that the stagnation pressure behind the closure element is less than the fluid pressure occurring in front of the closure element. By this measure, it is achieved that the closure element has a defined switching behavior, so that an oscillating movement of the closure element in a longitudinal direction of the piston and, as a result, a bouncing-back movement of the piston rod can be prevented in an overload case.

According to an embodiment, the closure element is configured so as to be limitedly displaceable relative to the piston in a longitudinal direction of the piston.

The closure element can be configured, for example, as a solid body. According to an alternative embodiment, the closure element can also be configured as a hollow body, for example in the form of a sleeve. A cavity of the closure element can namely be configured so as to at least partially accommodate the force storage member, whereby a very compact construction can be obtained.

BRIEF DESCRIPTION OF THE DRAWINGS

Further details and advantages of the present invention result from the following description of figures, in which.

DETAILED DESCRIPTION OF THE INVENTION

Figure 1:
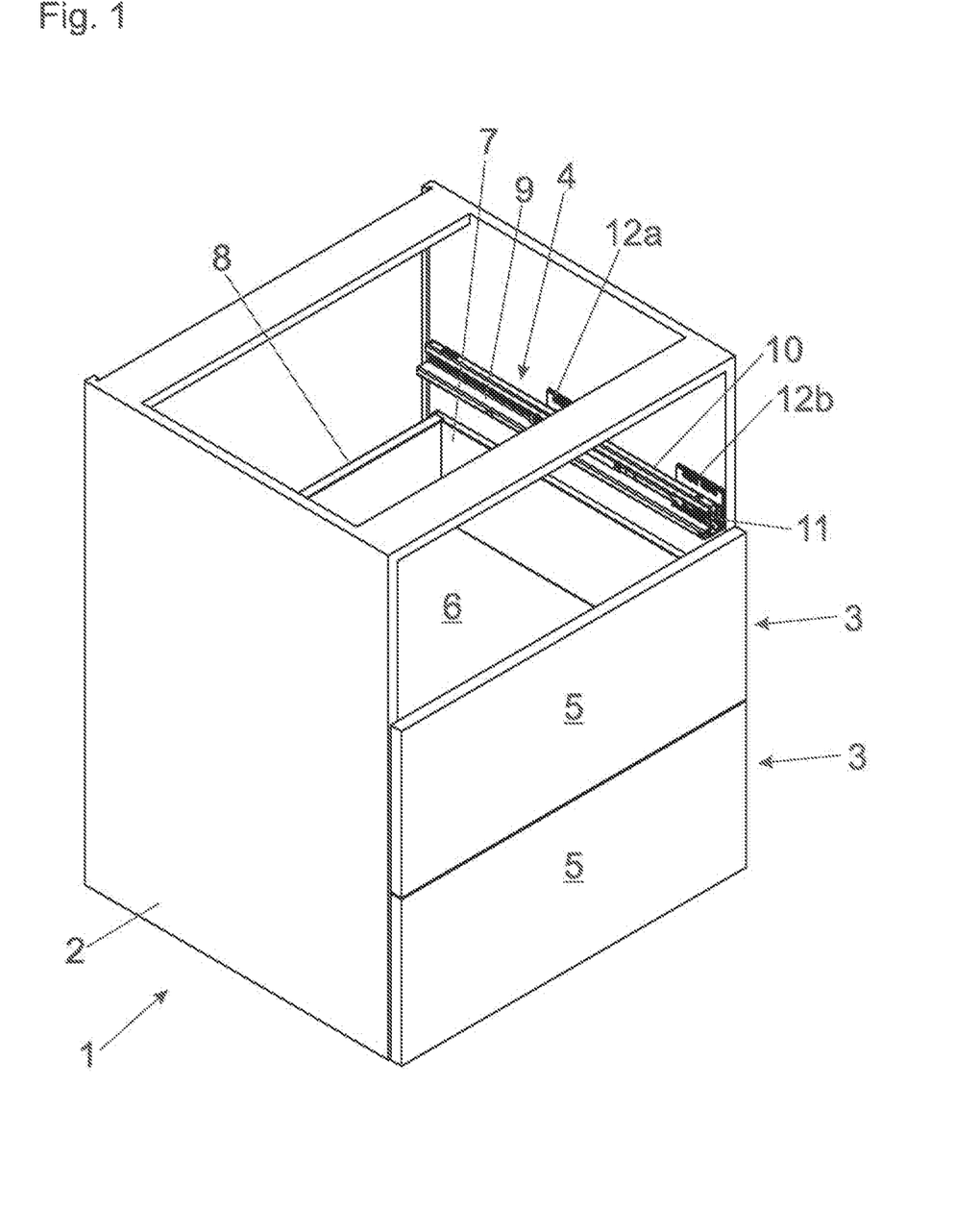
FIG. 1 is a perspective view of an item of furniture having a furniture carcass and drawers displaceably supported relative thereto.

FIG. 1 shows an item of furniture 1 having a cupboard-shaped furniture carcass 2, and movable furniture parts 3 in the form of drawers are displaceably supported relative to the furniture carcass 2 by drawer pull-out guides 4. Each of the drawers includes a front panel 5, a drawer bottom 6, drawer sidewalls 7 and a rear wall 8. Each of the drawer pull-out guides 4 includes a carcass rail 9 to be fixed to the furniture carcass 2 by fastening portions 12a, 12b, and a drawer rail 10 displaceably supported relative to the carcass rail 9. The drawer rail 10 is connected or is configured to be connected to the drawer sidewall 7. The drawer pull-out guide 4 optionally includes a central rail 11 which, in order to enable a full extension of the drawer, is displaceably supported between the carcass rail 9 and the drawer rail 10.

Figure 2:
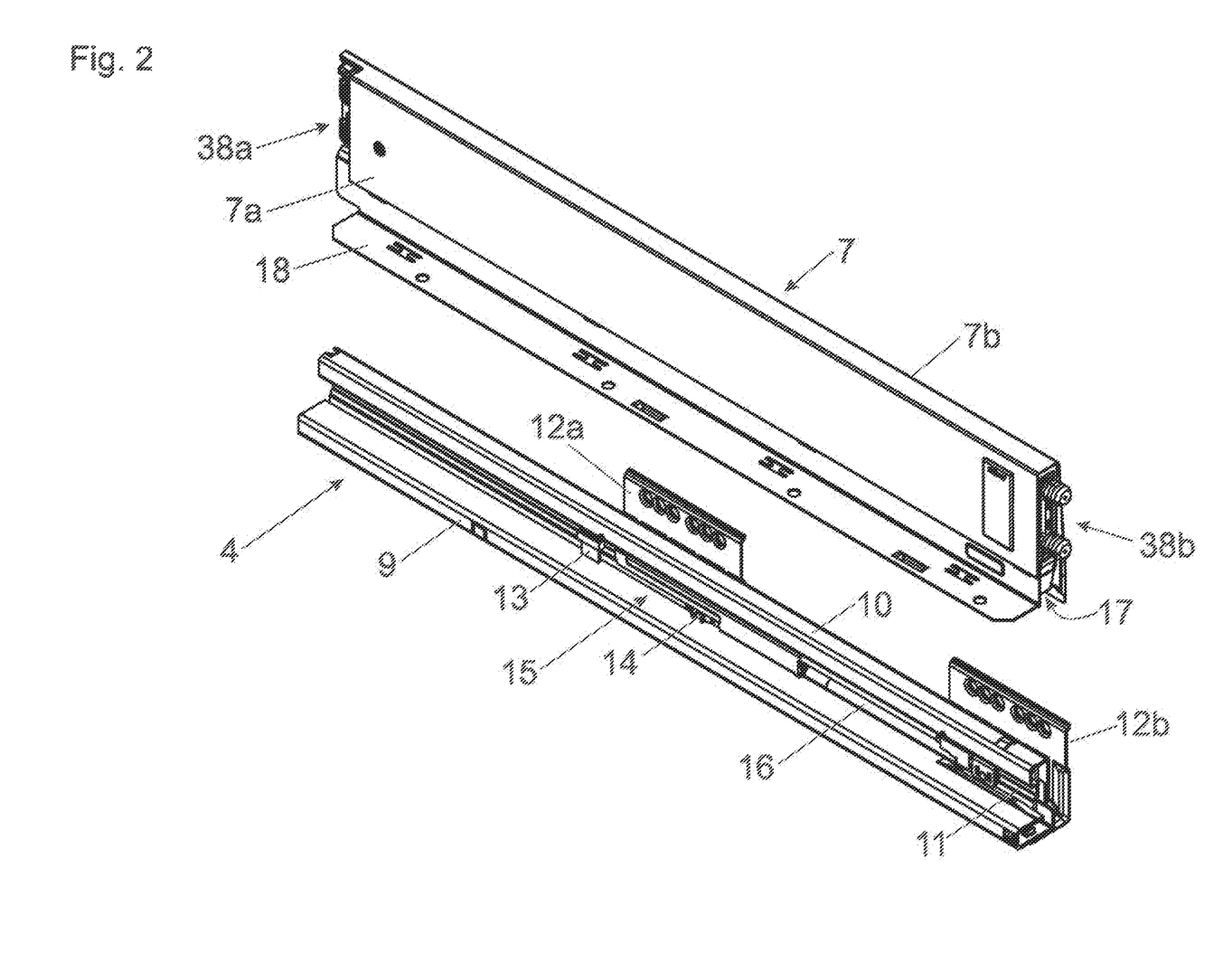
FIG. 2 shows a drawer pull-out guide having a drawer rail configured to be connected to a drawer side wall.

FIG. 2 shows a perspective view of the drawer pull-out guide 4 and the drawer rail 10 to be connected to the drawer sidewall 7. A displaceable central rail 11 is arranged between the drawer rail 10 and the carcass rail 9, and a coupling element 13 is arranged on the drawer rail 10. The coupling element 13 is configured to be releasably coupled to a spring-loaded entrainment member 14 of a retraction device 15, so that the drawer rail 10, at the end of the closing movement, can be engaged by the entrainment member 14 and can be retracted into the closed end position by a force storage member of the retraction device 15. By a furniture damper 16, which is yet to be described, with a, preferably hydraulic, piston-cylinder-unit, the spring-assisted retraction movement of the drawer rail 10 can be decelerated until reaching the closed end position.

The drawer side wall 7 is configured as a hollow-chamber profile having an inner profiled wall 7a and an outer profiled wall 7b. The drawer side wall 7 has a channel 17 for accommodating the drawer rail 10, the channel 17 being configured so as to be open towards the bottom and extending in a longitudinal direction of the drawer sidewall 7. The drawer sidewall 7 further includes a first fastening device 38a to be connected to the rear wall 8, a second fastening device 38b to be connected to the front panel 5, and a support portion 18 for supporting the drawer bottom 6.

Figure 3A:
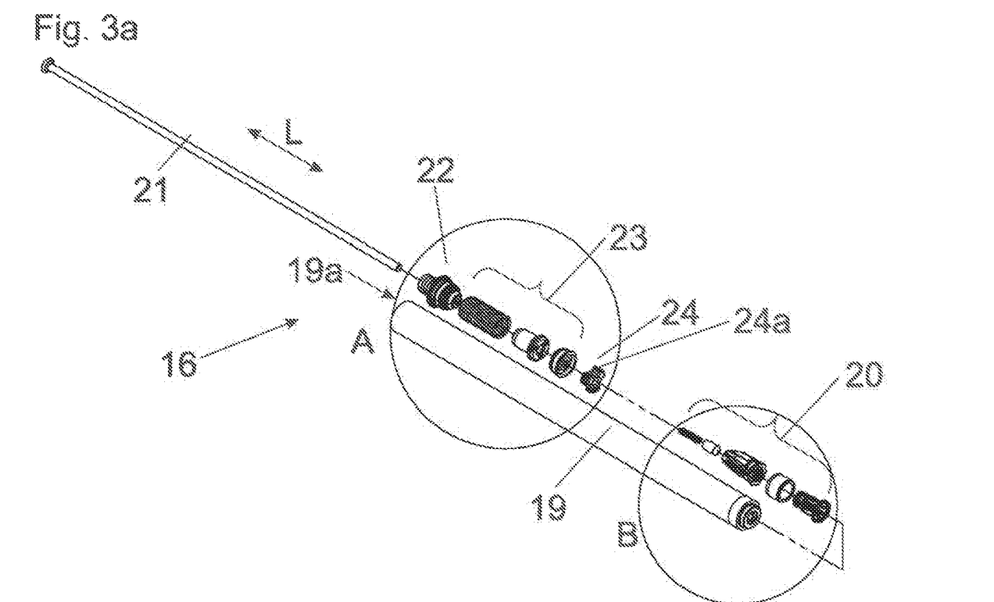
FIG. 3a-3c show a furniture damper in an exploded view, and two enlarged detail views thereof.

FIG. 3a shows the furniture damper 16 in an exploded view. The furniture damper 16 includes a, for example cylindrical, housing 19 in which a fluid chamber 19a for the displaceable support of a piston 20 is formed. The piston 20 is connected to a piston rod 21 protruding from the housing 19, and the piston 20 is displaceably supported within the fluid chamber 19a in a longitudinal direction (L) of the piston rod 21 between a first end position and a second end position. When performing a damping hub, the piston 20 can be decelerated against a resistance of a, preferably hydraulic, damping fluid arranged in the housing 19. The piston 20 can have a one-piece configuration or also a multi-piece configuration. By a movement of the piston rod 21 between the first end position and the second end position, a volume of the fluid chamber 19a can be varied. In order to compensate for a volume of the fluid chamber 19a, a deformable or a movable compensation device 23 is provided. At least one stabilizing element 24 is arranged in a region between the first end position and the second end position, and the stabilizing element 24 has an opening 24a for displaceably receiving the piston rod 21. As a result, the piston rod 21 can be stabilized in a direction transverse to the longitudinal direction (L) of the piston rod 21 when performing the damping hub. In this way, the piston rod 21 can be precisely guided in the longitudinal direction (L), and a distortion or a bulging of the piston rod 21 upon a movement in the longitudinal direction (L) can be prevented. In order the close the fluid chamber 19a in a fluid-tight manner, a closure portion 22 is provided.

Figure 3B:
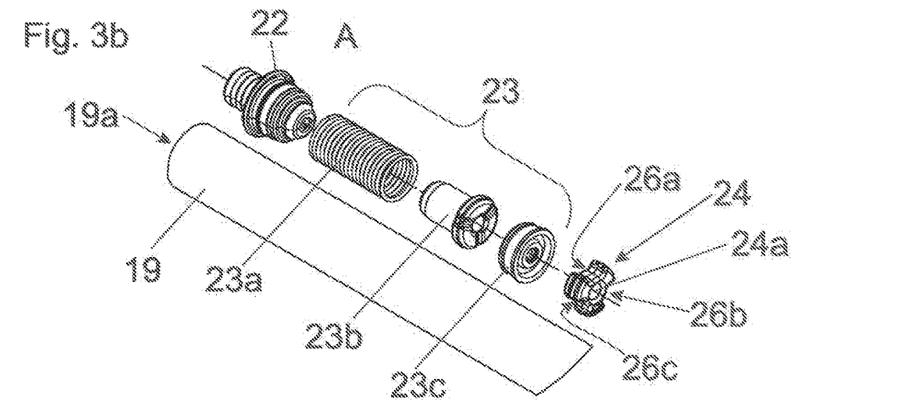

FIG. 3b shows the encircled region (A) of FIG. 3a in an enlarged view. The compensation device 23 can either include a compressible material portion (for example foamed rubber) or, alternatively, as shown in the figure, a seal 23c configured to be pressurized by a compression spring 23a, and the seal 23c is displaceably supported within the fluid chamber 19a along the piston rod 21. The seal 23c can be supported on the compression spring 23a by a bearing portion 23b. A size of the opening 24a of the, preferably disc-shaped, stabilizing element 24 corresponds substantially to a diameter of the piston rod 21. The stabilizing element 24, at least over a region, rests against an inner wall of the fluid chamber 19a and includes at least one, preferably peripheral, recess 26a for the passage of the damping fluid arranged in the fluid chamber 19a. In the shown embodiment, the stabilizing element 24 is provided with two or with a plurality of recesses 26a, 26b, 26c for the passage of the damping fluid. The stabilizing element 24 can be arranged either so as to be stationary in a region spaced from the two end positions of the piston 20, or, alternatively, can be movably supported in the longitudinal direction (L) in a limited manner.

Figure 3C:
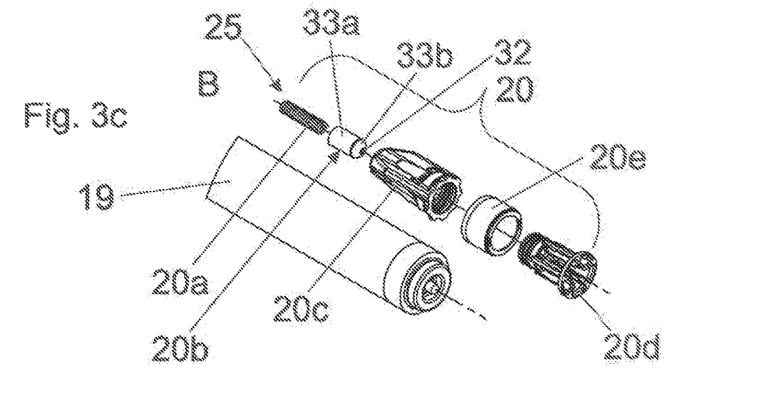

FIG. 3c shows the encircled region (B) of FIG. 3a in an enlarged view. The piston 20 includes two piston portions 20c, 20d connected to one another, and an overload safety device 25 having a closure element 20b. The closure element 20b is pressurized by a force storage member 20a in the form of a compression spring. The closure element 20b can have a cylindrical shell surface 33a and/or a conical shell surface 33b. By at least one throttle opening 32 of the closure element 20b, the damping fluid can stream through the closure element 20b. The piston 20 is provided with at least one overload opening 30 (see FIG. 4b), and the at least one overload opening 30 is blocked by the closure element 20b below a predetermined application of pressure to the piston 20. Above the predetermined application of pressure to the piston 20, the closure element 20b is moved against a force of the force storage member 20a, so that the overload opening 30 of the piston 20 is unblocked for the passage of the damping fluid in an overload case. In this way, a rapid pressure reduction in the fluid chamber 19a is brought about, without the housing 19, the piston 20 or a further component of the furniture damper 16 being damaged. By a switching ring 20e configured to be movable relative to the piston portions 20c, 20d, at least one piston opening 34 (see FIG. 5b) is blocked when performing the damping hub, so that the piston 20, upon a movement in a direction 29 (see FIG. 4a) of the damping hub, provides a large resistance to the damping fluid. On the contrary, upon a movement opposite the direction 29 of the damping hub, the switching ring 20e is moved in a position in which the piston opening 34 is unblocked, so that the piston 20 only provides a small resistance against the damping fluid, and the piston rod 21 can be rapidly pulled out again from the housing 19.

Figure 4A:
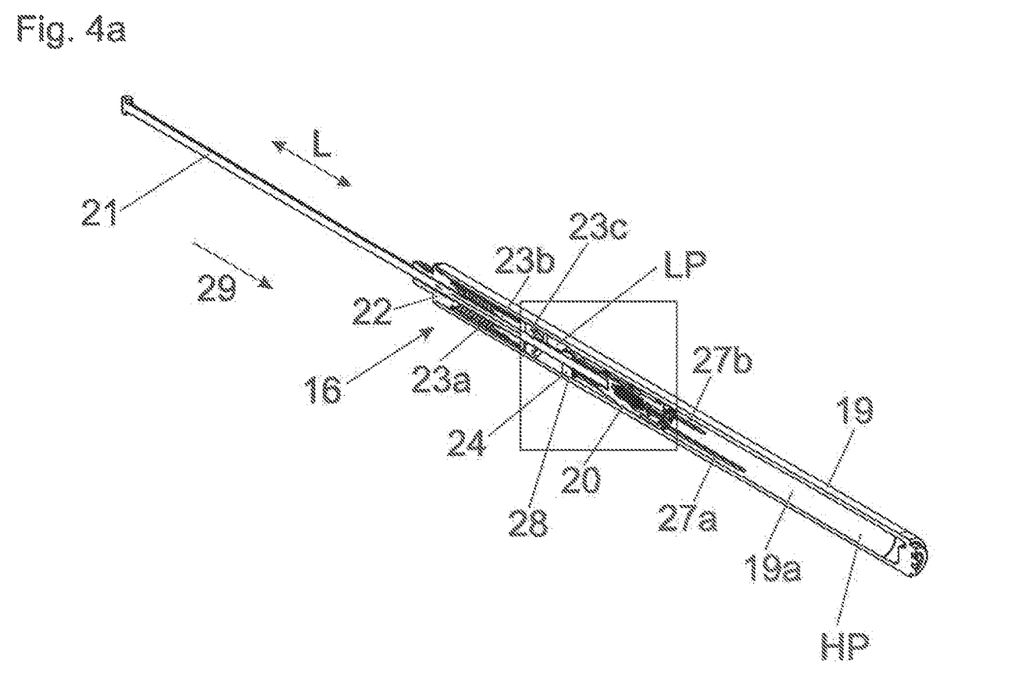
FIG. 4a, 4b show the furniture damper in a cross-sectional view and an enlarged detail view thereof.

FIG. 4a shows the furniture damper 16 in a perspective cross-sectional view. A fluid chamber 19a is formed in the housing 19 for the displaceable support of the piston 20. By flow channels 27a, 27b, preferably in the form of grooves, arranged on the inner wall of the housing 19, a path-dependent control of the damping power can be established. The flow channels 27a, 27b can be configured such that the operative flow cross-section can be reduced in the direction 29 of the damping hub. In this way, the flow resistance of the damping fluid and, as a result, the damping power are the greater the more the piston 20 is pushed into the housing 19. The piston rod 21 is passed through the closure element 22, the compression spring 23a, the bearing portion 23b, the seal 23c of the compensation device 23 and through the stabilizing element 24, and the piston rod 21 is connected to the piston 20.

Figure 4B:
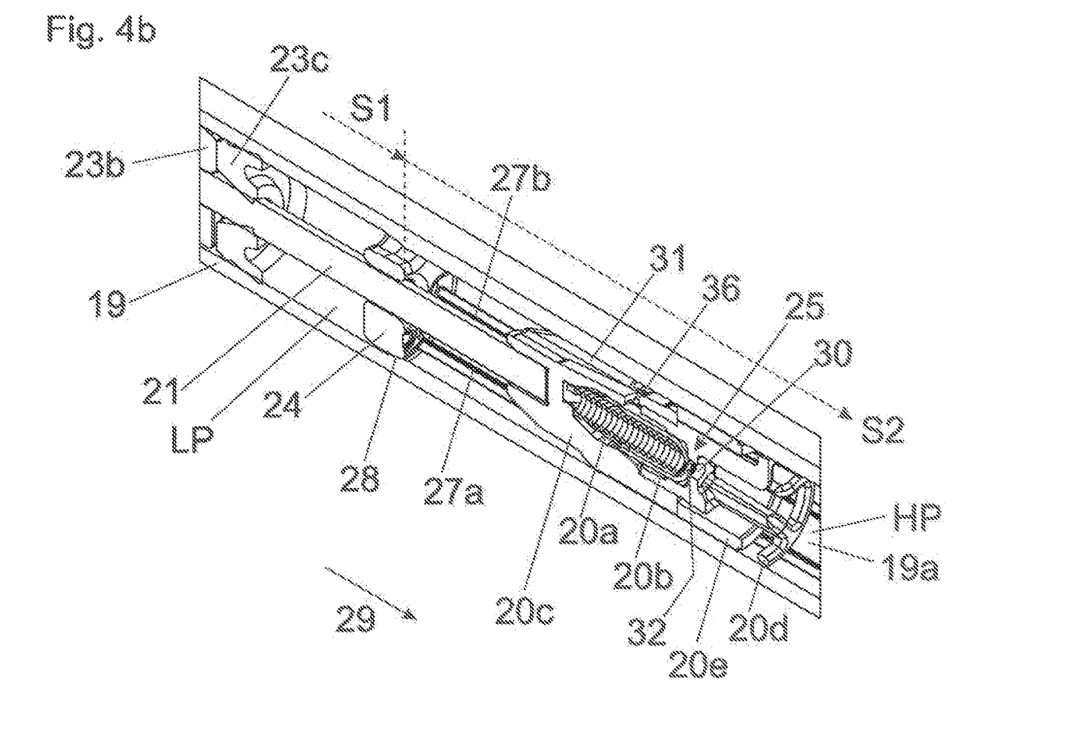

FIG. 4b shows the framed region of FIG. 4a in an enlarged view. Upon a movement of the piston 20 in the direction 29 of the damping hub, the piston rod 21 is pushed into the fluid chamber 19a, and the additional volume of the piston rod 21 can be compensated by the compensation device 23. This is accomplished such that the seal 23c, when the piston rod 21 is pushed into the fluid chamber 19a, moves against a force of the compression spring 23a, whereby the volume of the fluid chamber 19a is enlarged and, as a result, the additional volume of the piston rod 21 can be compensated for. The stabilizing element 24, in the shown embodiment, is limitedly movable within the fluid chamber 19a only over a first partial distance S1, and the housing 19 includes an abutment surface 28 for limiting a movement of the stabilizing element 24. In the shown embodiment, the abutment surface 28 is formed by a tapered portion of the fluid chamber 19a, and the tapered portion forms an annular inclined surface. In this way, the stabilizing element 24 is only displaceable along the first partial distance S1. The flow channels 27a, 27b are arranged along a second partial distance S2, and an entry of the seal 23c and a possible jamming between the seal 23c and the flow channels 27a, 27b can be prevented by the abutment surface 28.

The fluid chamber 19a has a high-pressure side (HP) and a low-pressure side (LP) which are separated from one another by the piston 20. When performing the damping hub in the direction 29, the piston 20 is pushed into the high-pressure side (HP) of the fluid chamber 19a. If the application of pressure to the piston 20 exceeds a predetermined threshold value, the overload safety device 25 becomes operative. For this purpose, the piston 20 includes at least one overload opening 30 which, during normal use (i.e. below the predetermined application of pressure to the piston 20) is blocked by the closure element 20b. When the predetermined application of pressure to the piston 20 is exceeded, the closure element 20b is moved against a force of the force storage member 20a, so that the overload opening 30 of the piston 20 is unblocked. By unblocking the overload opening 30, a fluid-conductive connection 31 between the high-pressure side (HP) and the low-pressure side (LP) is unblocked, so that the operative flow cross-section for the damping fluid can be enlarged. The damping fluid streams from the high-pressure side (HP) through the overload opening 30 and through a discharge channel 36 of the fluid-conductive connection 31 to the low-pressure side (LP). In this way, a rapid reduction of pressure in the fluid chamber 19a can be brought about.

Figure 5A:
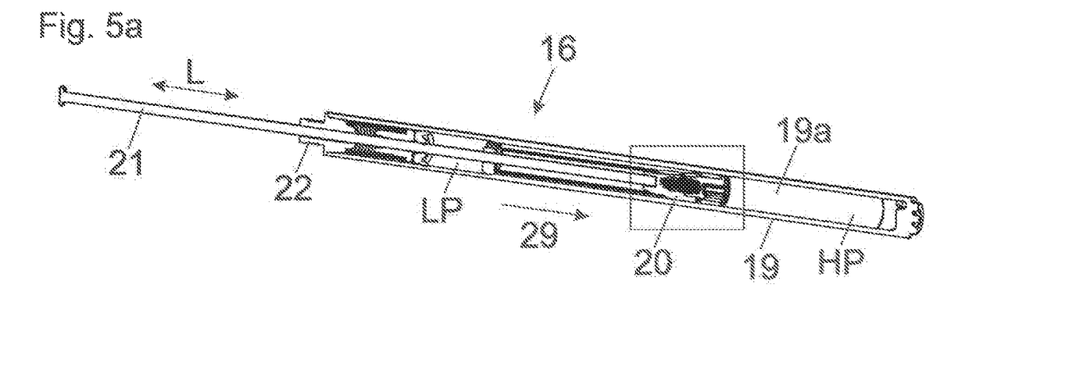
FIG. 5a-5c show the furniture damper in a perspective cross-sectional view, a first detail view during normal operation and a second detail view in an overload case.

FIG. 5a shows the furniture damper 16 in a perspective cross-sectional view. The high-pressure side (HP) and the low-pressure side (LP) are separated from one another by the piston 20, and the piston 20, when performing the damping hub, can be pushed into the housing 19 in the direction 29.

Figure 5B:
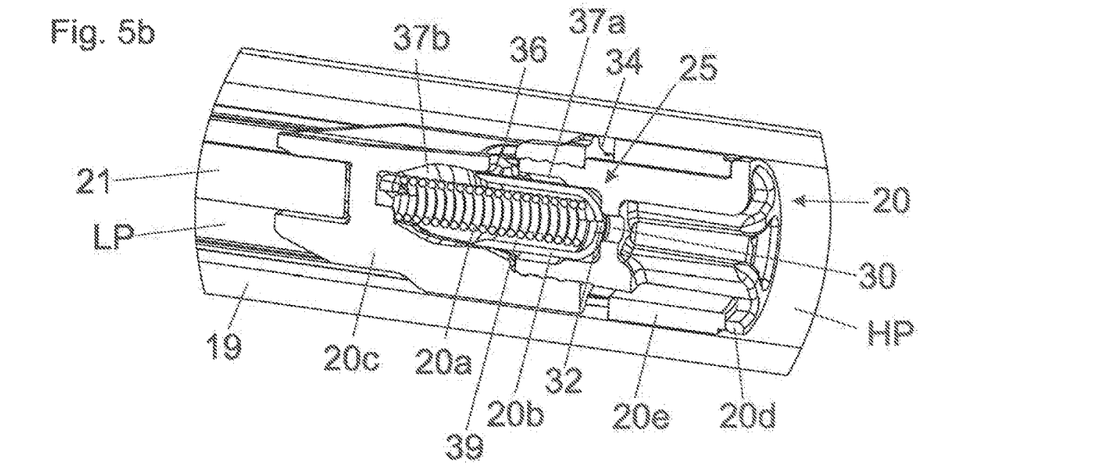

FIG. 5b shows the framed region of FIG. 5a in an enlarged view, in which the piston 20, upon performing the damping hub, is moved in the direction 29 below a predetermined threshold value of an application of pressure (normal operation). In this case, the overload opening 30 of the piston 20 is blocked by the closure element 20b by a force of the force storage member 20a. The damping fluid streams from the high-pressure side (HP) through the piston portion 20d and through at least one piston opening 34 and reaches the low-pressure side (LP), so that the movement of the piston 20 can be decelerated. In the shown embodiment, the piston 20 includes a first piston portion 20d and at least one second piston portion 20c connected to the first piston portion 20d. The first piston portion 20d has a first recess 37a in which the closure element 20b is at least partially accommodated. The second piston portion 20c has a second recess 37b in which the force storage member 20a is at least partially accommodated. Thereby, it can be provided that a longitudinal direction of the first recess 37a of the first piston portion 20d and a longitudinal direction of the second recess 37b of the second piston portion 20d extend coaxially to one another. The second piston portion 20c is connected to the piston rod 21 protruding from the housing 19 of the furniture damper 16. The closure element 20b can be configured as a hollow body, for example as a sleeve, and the force storage member 20a in the form of the compression spring is at least partially accommodated in a cavity 39 of the closure element 20b.

Figure 5C:
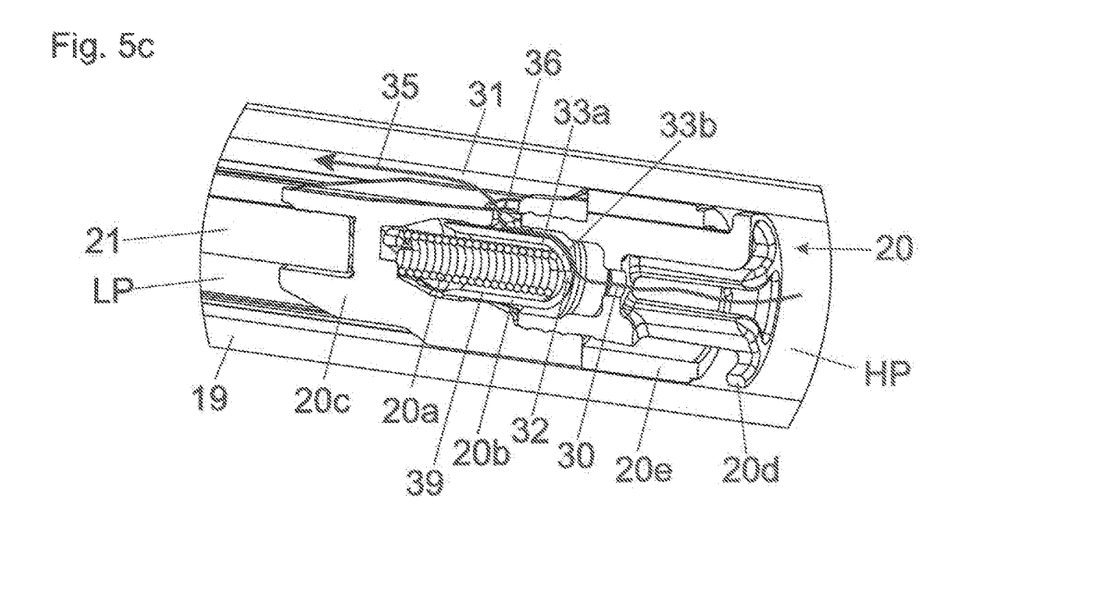

FIG. 5c, on the contrary, shows the framed region of FIG. 5a in an enlarged view. The piston 20, when performing the damping hub, is moved in the direction 29 above a predetermined threshold value of an application of pressure. In this overload case, the closure element 20b is pushed against a force of the force storage member 20a due to the prevailing fluid pressure, so that the overload opening 30 of the piston 20 is unblocked. Accordingly, in the overload case, the damping fluid located on the high-pressure side (HP) streams through the overload opening 30 of the piston 20, and the damping fluid passes downstream through the fluid-conductive connection 31 in a direction of the depicted arrow 35. The damping fluid is passed along the cylindrical and/or conical shell surface 33a, 33b of the closure element 20b in an axial direction or is deflected away from the cylindrical and/or conical shell surface 33a, 33b of the closure element 20b. The fluid-conductive connection 31 can include, for example, a bore arranged in the piston 20 or at least one discharge channel 36 having a longitudinal direction, and the longitudinal direction of the discharge channel 36 extends parallel or transversely, for example at a right angle, to a longitudinal direction (L) of the piston 20. Due to the cylindrical and/or conical shell surface 33a, 33b of the closure element 20b, the damping fluid, in an overload case, can be deflected downstream the overload opening 30 such that a stagnation pressure in a region behind (i.e. downstream) of the closure element 20b or an undesired oscillating movement of the closure element 20b in the longitudinal direction (L) can be prevented. It is preferably provided that a length of the closure element 20b is at least twice of a diameter of the closure element 20b.

The closure element 20b includes at least one throttle opening 32, which preferably extends coaxially to the overload opening 30, for the passage of the damping fluid. The throttle opening 32 serves for stabilizing the piston 20, in particular right before reaching the pressed-in end position. The damping action of the piston 20, as shown and described in FIG. 4a, can namely be configured in a multi-stage manner. By the first flow channel 27b, a movement of the piston 20 can be dampened over a first partial distance, by the second flow channel 27a over a second partial distance and by the throttle opening 32 over a third partial distance until reaching the pressed-in end position. The damping fluid thereby streams via the throttle opening 32 into the recesses 37a, 37b of the piston 20 and then reaches, from the recess 37b of the second piston portion 20c, to the low-pressure side (LP) of the fluid chamber 19a.

Figure 6A:
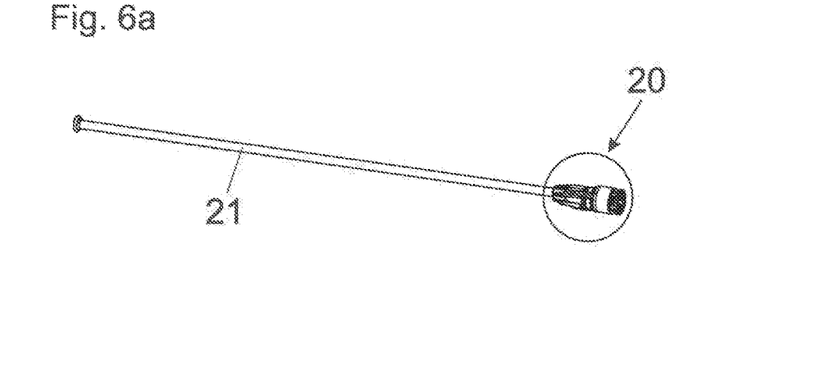
FIG. 6a-6e show the piston with the piston rod in a perspective view and an enlarged detail view thereof, and three different embodiments of the closure element in schematic views.
Figure 6B:
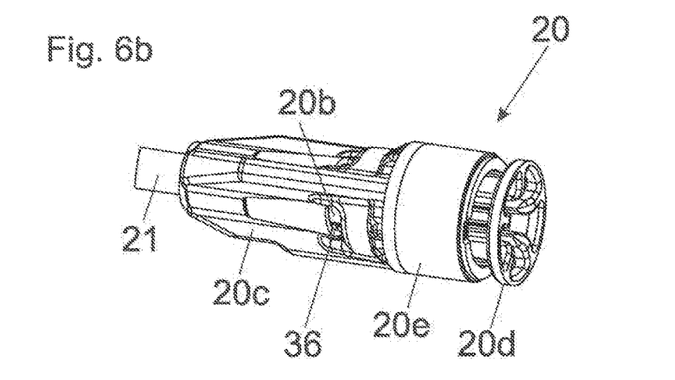

FIG. 6a shows a first perspective view of the piston 20 and the piston rod 21 connected therewith. FIG. 6b shows the encircled region of FIG. 6a in an enlarged view. Visible is the first piston portion 20d and the second piston portion 20c between which the switching ring 20e and the closure element 20b are limitedly displaceable. The second piston portion 20c is provided with at least one discharge channel 36 through which the damping fluid can escape in an overload case.

Figure 6C:
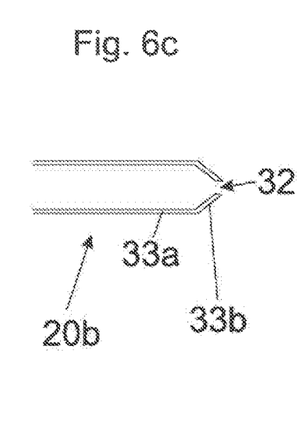

FIG. 6c shows a possible embodiment of the closure element 20b having a cylindrical shell surface 33a and/or a conical shell surface 33b. By the throttle opening 32, the damping fluid can stream through the closure element 20b.

Figure 6D:
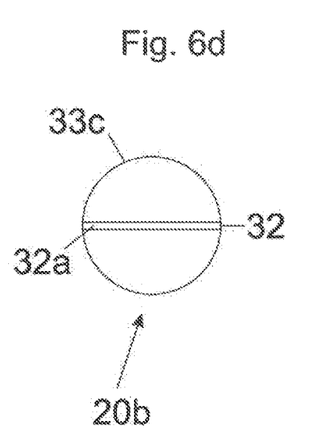

FIG. 6d shows the closure element 20b having a substantially spherical surface 33c. The damping fluid can stream through the throttle opening 32 into the closure element 20b and is transported through the channel 32a to the low-pressure side (LP). For fixing a position of the closure element 20b, a guide (not shown) may be provided, so that the closure element 20b cannot rotate about an own axis.

Figure 6E:
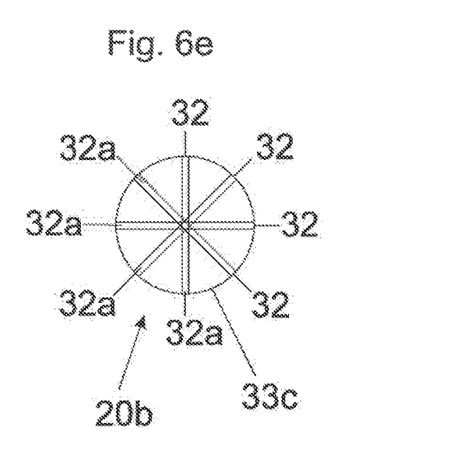

FIG. 6e shows the closure element 20b having a spherical surface 33c. Two or more throttle openings 32 are provided for the passage of the damping fluid, and two or more channels 32a are provided for the discharge of the damping fluid. Here, a guide for fixing a position of the closure element 20b is not mandatorily required, because the damping fluid, also upon a rotation of the closure element 20b about an own axis, can stream into the throttle openings 32 orientated in different directions.

Although the furniture damper 16, with the aid of FIG. 2, has been disclosed in combination with a furniture fitting in the form of a drawer pull-out guide 4, it is immediately apparent that the furniture damper 16 can also be utilized in combination with a holding plate for supporting the furniture damper 16, with a furniture hinge or with a furniture drive for moving a movably-supported furniture part 3.

The invention claimed is:

1. A furniture fitting having at least one furniture damper for dampening a movement of a movably supported furniture part, the at least one furniture damper comprising:
   a housing;
   at least one fluid chamber arranged in the housing, the at least one fluid chamber having a high-pressure side and a low-pressure side;
   a damping fluid arranged in the at least one fluid chamber;
   at least one piston having at least one overload opening, the at least one piston being displaceably arranged in the at least one fluid chamber for performing a damping action, and the high-pressure side of the at least one fluid chamber and the low-pressure side of the at least one fluid chamber being separated from one another by the at least one piston; and
   an overload safety device arranged in the at least one piston, the overload safety device having a closure element pressurized by a force storage member, wherein the closure element is configured to block the at least one overload opening of the at least one piston below a threshold value of a pressure application to the at least one piston, and unblock the at least one overload opening of the at least one piston against a force of the force storage member above the threshold value of the pressure application to the at least one piston, wherein due to unblocking of the at least one overload opening of the at least one piston, a fluid-conductive connection between the high-pressure side of the at least one fluid chamber and the low-pressure side of the at least one fluid chamber is unblocked,
   wherein:
   the closure element includes at least one throttle opening for passage of the damping fluid from the high-pressure side of the at least one fluid chamber to the low-pressure side of the at least one fluid chamber at least when performing the damping action;
   the at least one piston includes a first piston portion and a second piston portion; and
   a switching ring is arranged between the first piston portion and the second piston portion, the switching ring being configured to: (i) be moved relative to the first piston portion and the second piston portion; and (ii) block at least one piston opening when performing the damping action.

2. The furniture fitting according to claim 1, wherein the at least one throttle opening is configured to be open in each operating position of the at least one furniture damper.

3. The furniture fitting according to claim 1, wherein the closure element has a cylindrical and/or conical shell surface, and the damping fluid, above the threshold value of the pressure application to the at least one piston, can be passed along the cylindrical and/or conical shell surface downstream of the at least one overload opening through the fluid-conductive connection along the cylindrical and/or conical shell surface in an axial direction, or can be deflected away from the cylindrical and/or conical shell surface in a radial direction.

4. The furniture fitting according to claim 1, wherein the closure element is configured to be limitedly displaceable relative to the at least one piston in a longitudinal direction of the at least one piston.

5. The furniture fitting according to claim 1, wherein the closure element includes a cavity in which the force storage member is at least partially accommodated.

6. The furniture fitting according to claim 1, wherein the at least one throttle opening is arranged coaxially with the at least one overload opening.

7. The furniture fitting according to claim 1, wherein the fluid-conductive connection includes at least one bore or a discharge channel arranged in the at least one piston, the discharge channel having a longitudinal direction extending parallel or transverse to a longitudinal direction of the at least one piston.

8. The furniture fitting according to claim 7, wherein the longitudinal direction of the discharge channel extends at a right angle with respect to the longitudinal direction of the piston.

9. The furniture fitting according to claim 1, wherein the first piston portion includes a first recess in which the closure element is at least partially accommodated.

10. The furniture fitting according to claim 1, wherein the second piston portion includes a second recess in which the force storage member is at least partially accommodated.

11. The furniture fitting according to claim 1, wherein:
the first piston portion includes a first recess in which the closure element is at least partially accommodated;
the second piston portion includes a second recess in which the force storage member is at least partially accommodated; and
a longitudinal direction of the first recess of the first piston portion and a longitudinal direction of the second recess of the second piston portion extend coaxially with one another.

12. The furniture fitting according to claim 1, wherein the second piston portion is connected to a piston rod.

13. The furniture fitting according to claim 12, wherein the piston rod is configured to be led out from the housing of the at least one furniture damper.

14. The furniture fitting according to claim 12, wherein the piston rod, for performing the damping action, is displaceable between a first end position and a second end position, and at least one stabilizing element is arranged in a region between the first end position and the second end position, the at least one stabilizing element having an opening for displaceably receiving the piston rod, so that the piston rod, upon performing the damping action, can be stabilized in a direction transverse to a longitudinal direction of the piston rod.

15. The furniture fitting according to claim 1, wherein the force storage member includes at least one helical spring.

16. The furniture fitting according to claim 15, wherein the at least one helical spring is at least one compression spring.

17. The furniture fitting according to claim 1, wherein the furniture fitting is configured as: (i) a drawer pull-out guide; (ii) a holding plate for supporting the at least one furniture damper; (iii) a furniture hinge; or (iv) a furniture drive for moving the movably-supported furniture part.

18. A furniture fitting having at least one furniture damper for dampening a movement of a movably supported furniture part, the at least one furniture damper comprising:
a housing;
at least one fluid chamber arranged in the housing, the at least one fluid chamber having a high-pressure side and a low-pressure side;
a damping fluid arranged in the at least one fluid chamber;
at least one piston having at least one overload opening, the at least one piston being displaceably arranged in the at least one fluid chamber for performing a damping action, and the high-pressure side of the at least one fluid chamber and the low-pressure side of the at least one fluid chamber being separated from one another by the at least one piston; and
an overload safety device arranged in the at least one piston, the overload safety device having a closure element pressurized by a force storage member, wherein the closure element is configured to block the at least one overload opening of the at least one piston below a threshold value of a pressure application to the at least one piston, and unblock the at least one overload opening of the at least one piston against a force of the force storage member above the threshold value of the pressure application to the at least one piston, wherein due to unblocking of the at least one overload opening of the at least one piston, a fluid-conductive connection between the high-pressure side of the at least one fluid chamber and the low-pressure side of the at least one fluid chamber is unblocked,
wherein:
the closure element includes at least one throttle opening for passage of the damping fluid from the high-pressure side of the at least one fluid chamber to the low-pressure side of the at least one fluid chamber at least when performing the damping action; and
the fluid-conductive connection includes at least one discharge channel arranged in the at least one piston, the at least one discharge channel having a longitudinal direction extending transverse to a longitudinal direction of the at least one piston.

19. A furniture fitting having at least one furniture damper for dampening a movement of a movably supported furniture part, the at least one furniture damper comprising:
a housing;
at least one fluid chamber arranged in the housing, the at least one fluid chamber having a high-pressure side and a low-pressure side;
a damping fluid arranged in the at least one fluid chamber;
at least one piston having at least one overload opening, the at least one piston being displaceably arranged in the at least one fluid chamber for performing a damping action, and the high-pressure side of the at least one fluid chamber and the low-pressure side of the at least one fluid chamber being separated from one another by the at least one piston; and
an overload safety device arranged in the at least one piston, the overload safety device having a closure element pressurized by a force storage member, wherein the closure element is configured to block the at least one overload opening of the at least one piston below a threshold value of a pressure application to the at least one piston, and unblock the at least one overload opening of the at least one piston against a force of the force storage member above the threshold value of the pressure application to the at least one piston, wherein due to unblocking of the at least one overload opening of the at least one piston, a fluid-conductive connection between the high-pressure side of the at least one fluid chamber and the low-pressure side of the at least one fluid chamber is unblocked, wherein:

the closure element includes at least one throttle opening for passage of the damping fluid from the high-pressure side of the at least one fluid chamber to the low-pressure side of the at least one fluid chamber at least when performing the damping action;

a first flow channel and a second flow channel are arranged on an inner wall of the housing; and a movement of the at least one piston can be dampened over a first partial distance by the first flow channel, over a second partial distance by the second flow channel, and by the at least one throttle opening over a third partial distance until reaching a pressed-in end position.

\* \* \* \* \*